Patented Nov. 17, 1925.

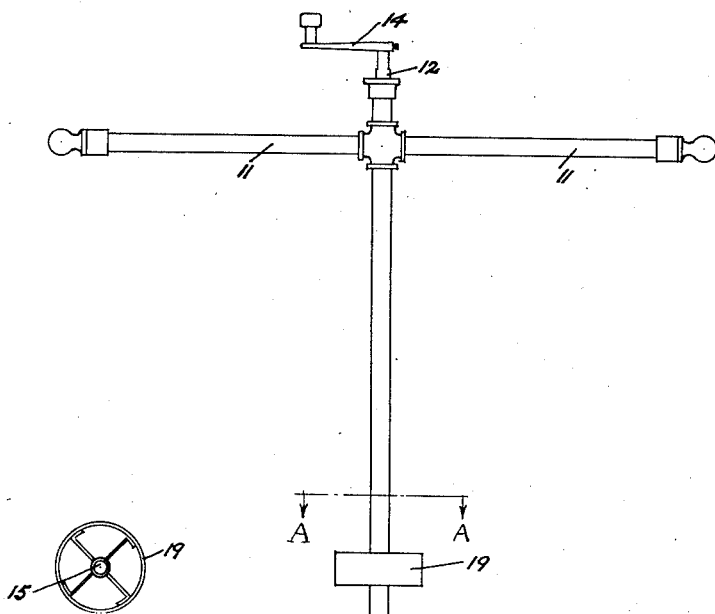
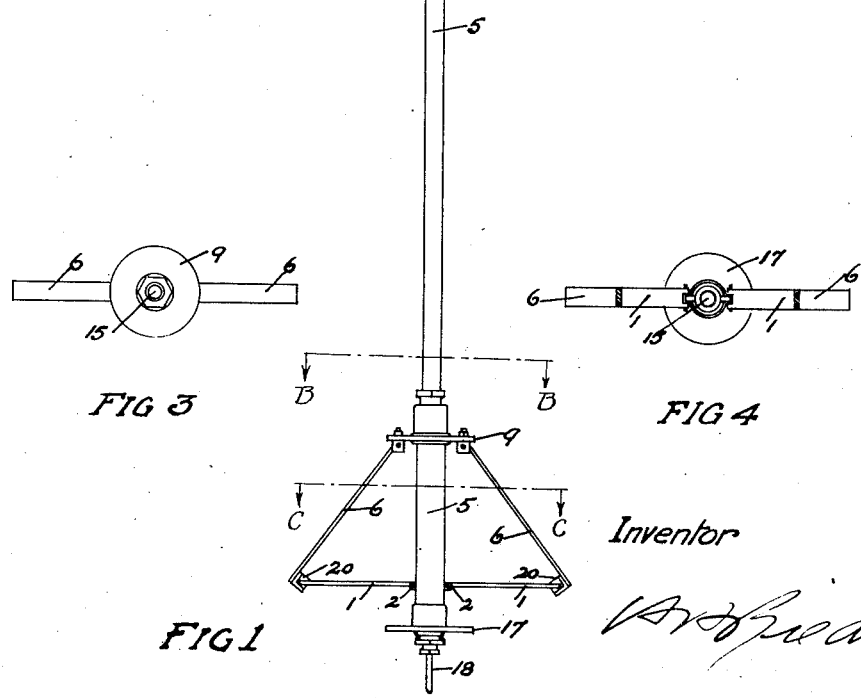

1,561,523

UNITED STATES PATENT OFFICE.

ARNOLD WILLIAM RIEDLE, OF WINNIPEG, MANITOBA, CANADA.

POSTHOLE AUGER.

Application filed November 19, 1923. Serial No. 675,659.

*To all whom it may concern:*

Be it known that I, ARNOLD WILLIAM RIEDLE, of the city of Winnipeg, Province of Manitoba, Dominion of Canada, brewer, have invented certain new and useful Improvements in Posthole Augers, of which the following is a specification.

My invention relates to improvements in a machine for digging holes in the ground for fence posts, telephone and electric light poles, building foundations, etc., and the objects of my invention are to enlarge the bottom of the holes to obtain a larger area of bearing surface and ensure greater stability for any post whether of wood, concrete or any other material which may be placed in the hole and afterwards secured by filling in the voids between post and earth with plastic concrete.

I also claim that an excellent foundation may be obtained for buildings by sinking holes into the ground to the required depth and afterwards enlarging the bottom to get sufficient bearing area to carry the superimposed load. The enlarged hole would then be filled with plastic concrete up to the required elevation.

I attain these objects by first boring a hole of any desired size and to the proper depth with any kind of post hole auger, and afterwards enlarge the hole by the mechanism shown in the accompanying drawings, in which:—

Fig. 1, is an elevation of the machine with the detail omitted.

Fig. 2, is horizontal section at A—A of Fig. 1, showing the top guide.

Fig. 3, is a horizontal section at B—B of Fig. 1, showing the cutter bars 1, on plan.

Fig. 4, is a horizontal section of C—C of Fig. 1, showing the parts of the upper cutter bars.

Similar letters refer to similar parts thoughout the several views.

Figure 5:
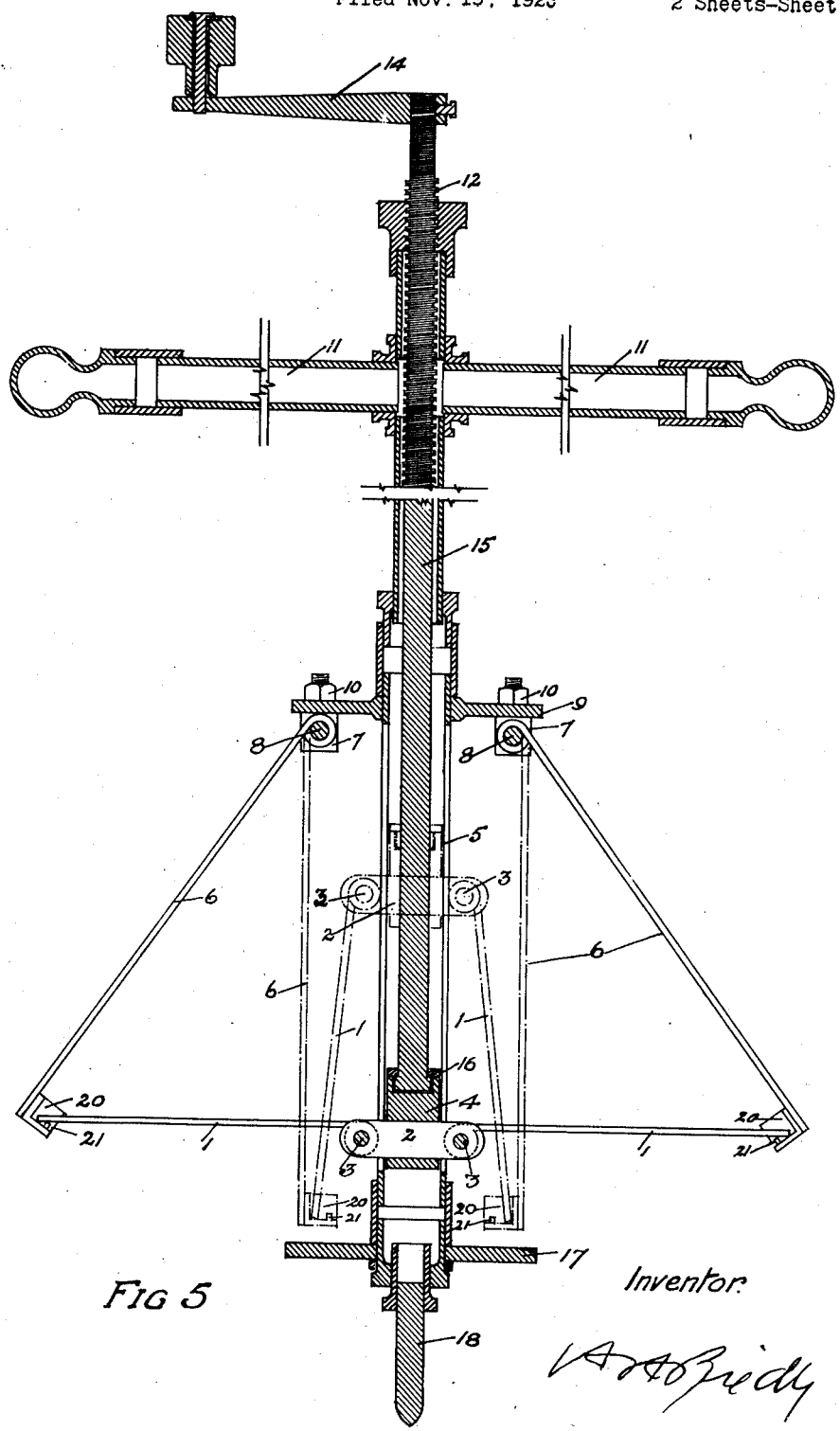
Fig. 5, is a fragmentary vertical section taken through the vertical axis of the machine, showing detail of the feed screw and driving piston.

Referring to the drawings:

The lower cutter bars 1, are sharpened on the leading edges which are hinged to the bar 2 by the pins 3.

The bar 2, passes through a slot in the piston 4 and also through a slot in the casing 5, which slot in the casing extends from a point just below the bar, to a point above the highest point of travel of the bar.

The upper cutter bars 6, are sharpened on the leading edges and are hinged to studs 7 by pins 8. Studs 7 are in turn tapped into plate 9 and locked with nuts 10, plate 9 being rigidly fastened to casing 5.

Cross arms 11 are fastened to casing 5 and serve to revolve casing 5 and with it cutter bars 1 and 6.

Handle 14 is attached to the upper end of feed screw 12, which serves to actuate the rod 15 and in turn the piston 4. The rod 15 is attached to piston 4 by collar 16, which is a sliding fit to allow rod 15 to be revolved while piston 4 is stationary.

The bottom plate 17 is attached to pin 18. These together with guide 19 serve to keep the machine centered in the hole.

The sockets 20 are attached to the ends of cutter bars 6, which together with pins 21, serve to keep the cuter bars 1 in place while driving.

The operation of the machine is as follows:

The handle 14 is turned in an anticlockwise direction which draws the piston 4 and bar 2 upwards and towards plate 9. Bar 2 in turn draws up the inner end of cutter bars 1 until they hang in a vertical position. In the meantime the outer ends of the cutter bars 6 have fallen and also hang parallel with the vertical axis of the machine.

The ends of the cutter bars 1 are inserted into sockets 21 and the machine is lowered into a previously bored hole; the handle 14 is revolved in a clockwise direction until the piston 4 and bar 2 has descended far enough to force out cutter bars 6 into contact with the earth, the cross arms 11 are then revolved in a horizontal plane and the feed screw 12 gradually tightened by handle 14. This drives the cutter bars gradually downward and outward and forms a coniform sided hole with the bottom sloping slightly towards the center, the curve of the bottom being approximately the arc of a circle whose radius is the length of the cutter bar 6. After the hole has been enlarged to the desired size the handle 14 is revolved in an anticlockwise direction which serves to retract the cutter bars until they are in a position parallel with the vertical axis of the machine, after which the machine can be withdrawn from the hole and the débris removed.

What I do claim as my invention and desire to secure by Letters Patent; is;—

1. In a post hole auger, a hollow casing having a handle, a non-rotary, vertically adjustable member carried by the casing, a series of cutter bars having their inner ends hinged to the vertically adjustable member and their outer ends free, a series of cutter bars having their inner ends hinged to the casing in a location above the adjustable member and their lower ends free and sockets carried by the latter ends of the latter cutter bars and receiving the outer ends of the former cutter bars.

2. In a post hole auger, a hollow casing having the upper end thereof provided with a handle and the lower end thereof provided with diametrically opposing, vertically extending slots, a bar slidably mounted in the slots, means actuated from the upper end of the casing for vertically adjusting the bar within the slots, lower cutter bars having their inner ends hinged to the adjustable bar and their outer ends free, upper cutter bars having their upper ends hinged to the casing in a location adjacent the upper ends of the slots and their lower ends free and sockets carried by the latter ends of the latter bars and receiving the outer ends of the lower bars.

3. In a post hole auger, a casing provided at its upper end with a handle and having diametrically opposing, vertically extending slots in the lower end thereof, a cross bar crossing the casing and slidably received within the slots, a feed screw mounted in the upper end of the casing and provided with a handle, said feed screw having the lower end thereof extending downwardly within the casing and swivelly attached to the cross bar, lower cutter bars having their inner ends hinged to the ends of the cross bar and their outer ends free, upper cutter bars having their upper ends hinged to the casing in a location adjacent the upper ends of the slots and their lower ends free and sockets carried by the lower ends of the upper cutter bars and receiving the outer ends of the lower cutter bars.

Dated at the city of Winnipeg in the Province of Manitoba in the Dominion of Canada this 30th day of October 1923.

A. W. RIEDLE.